United States Patent [19]

Noll et al.

[11] 4,237,264
[45] Dec. 2, 1980

[54] PROCESS FOR THE PREPARATION OF POLYURETHANES WHICH ARE DISPERSIBLE IN WATER

[75] Inventors: Klaus Noll, Cologne; Klaus Nachtkamp, Bergisch-Gladbach; Josef Pedain, Cologne, all of Fed. Rep. of Germany

[73] Assignee: Bayer Aktiengesellschaft, Leverkusen, Fed. Rep. of Germany

[21] Appl. No.: 849,690

[22] Filed: Nov. 8, 1977

[30] Foreign Application Priority Data

Nov. 11, 1976 [DE] Fed. Rep. of Germany ....... 2651506

[51] Int. Cl.$^3$ ............... C08G 18/12; C08G 18/32; C08L 75/08; C08L 75/12
[52] U.S. Cl. ............................ 528/67; 528/68; 528/69; 528/71; 260/29.2 TN
[58] Field of Search ............... 260/29.2 TN; 528/67, 528/68, 69, 71

[56] References Cited

U.S. PATENT DOCUMENTS

| 3,479,310 | 11/1969 | Dieterich et al. | 260/29.2 TN |
|---|---|---|---|
| 3,796,678 | 3/1974 | Bartizal | 260/29.2 TN |
| 3,905,929 | 9/1975 | Noll | 260/29.2 TN |
| 3,920,598 | 11/1975 | Reiff et al. | 260/29.2 TN |
| 3,935,146 | 1/1976 | Noll et al. | 260/29.2 TN |
| 3,951,897 | 4/1976 | Matsuda et al. | 260/29.2 TN |
| 3,993,615 | 11/1976 | Markofsky et al. | 260/29.2 TN |
| 4,028,313 | 6/1977 | Muller et al. | 260/29.2 TN |
| 4,046,729 | 9/1977 | Scriven et al. | 260/29.2 TN |
| 4,048,001 | 9/1977 | Remley | 260/29.2 TN |
| 4,066,592 | 1/1978 | Wismer et al. | 260/29.2 TN |
| 4,068,035 | 1/1978 | Violland et al. | 260/29.2 TN |
| 4,092,286 | 11/1978 | Noll et al. | 260/29.2 TN |

*Primary Examiner*—Wilbert J. Briggs, Sr.
*Assistant Examiner*—Arthur H. Koeckert
*Attorney, Agent, or Firm*—Gene Harsh; Joseph C. Gil; R. Brent Olson

[57] ABSTRACT

The instant invention is directed to novel polyurethanes which have a substantially linear molecular structure and which are dispersible in water, and the method of producing such polyurethanes. The polyurethanes of the present invention are characterized by an ethylene oxide unit content of from 0.5 to 10%, by weight, and by an ionic content of from 0.1 to 15 milliequivalents per 100 grams of polyurethane.

10 Claims, No Drawings

PROCESS FOR THE PREPARATION OF POLYURETHANES WHICH ARE DISPERSIBLE IN WATER

BACKGROUND OF THE DISCLOSURE

Aqueous dispersions of polyurethanes or polyurethane ureas are known (for example, in Angewandte Chemie, 82 (1970) pages 53 to 63 and U.S. Pat. Nos. 3,920,598 and 3,905,929). These dispersions are of high quality.

Not least among the factors which contribute to this high quality is the fact that many of these dispersions are free from emulsifiers. They contain chemically incorporated hydrophilic centers which make the otherwise hydrophobic elastomers self-emulsifiable. This method of making dispersions self-emulsifiable has two major advantages over the use of emulsifiers:

(1) a smaller number of hydrophilic centers is required;
(2) the built-in emulsifier cannot migrate inside molded products produced from such elastomer dispersions; this generally has an important influence on the overall properties of the product.

In particular, the first of these two features considerably reduces the sensitivity to water of molded products produced from self-emulsified polyurethanes. The hydrophilic centers incorporated in these known water-dispersible polyurethanes or polyurethane ureas may be both salt-like, i.e., ionic groups, and also hydrophilic non-ionic groups. Among the last mentioned non-ionic polyurethanes which are dispersible in water may be included in particular the polyurethanes or polyurethane ureas containing polyethylene oxide units in side chains as described in U.S. Pat. Nos. 3,920,598 and 3,905,929.

The dispersions of these polyurethanes have a variety of characteristic properties depending on the type of hydrophilic center. Polyurethane ionomer dispersions, for example, are resistant to heat up to their boiling point because the solubility of the salt groups contained in them is virtually independent of the temperature, whereas non-ionic dispersions coagulate even when heated to moderate temperatures (e.g., about 60° C.) because the polyethylene oxide side chains gradually lose their solubility in water at elevated temperatures. Unlike ionomers, these dispersions are unaffected by the addition of substantially unlimited quantities of electrolytes and are also resistant to freezing and thawing.

The sensitivity to electrolytes is particularly high in cationic polyurethanes. Aqueous dispersions of polyurethanes containing quaternary ammonium or tertiary sulphonium groups coagulate instantly even when only a very small quantity of an electrolyte having monovalent ions, such as sodium chloride, is added in aqueous solution. Due to this property, the preparation and application of cationic polyurethane dispersion involve special problems. The water used for their preparation must generally be substantially free from ions. So-called "hard" water causes undesirable coarsening of the dispersed particles or partial coagulation. Pigmentation of cationic dispersions is frequently difficult because ions adsorbed on the surface of the pigments obstruct incorporation of the pigments and lead to unsatisfactory results. The extreme sensitivity of cationic polyurethane dispersions to various additives has made their commercial application very difficult or even impossible. On the other hand, cationic dispersions have very desirable properties such as very firm adherence to a variety of substrates and excellent film-forming properties.

The present invention provides new water dispersible polyurethanes which, in the form of their aqueous dispersions, combine the advantages of excellent frost-resistance and resistance to electrolytes with the advantage of very high temperature resistance.

DESCRIPTION OF THE INVENTION

It has surprisingly been found that such water dispersible polyurethane elastomers can be obtained if both (a) hydrophilic chains which contain ethylene oxide units in terminal positions and (b) ionic groups are incorporated into the polyurethane.

This is certainly surprising since it was found that mixtures of aqueous dispersions of ionic and hydrophilic non-ionic polyurethanes by no means have such a combination of desirable properties. On the contrary, mixtures of this type are characterized mainly by the disadvantages of their individual constituents.

The incorporation of hydrophilic polyether segments at the ends of the main polymer chain provides a surprisingly effective protection for ionic, and particularly cationic polyurethanes against the action of electrolytes. Thus, the dispersions are not precipitated by dilute sodium chloride solution.

Compared with products where the hydrophilic polyether segments are statistically distributed over the whole main polymer chain, the dispersions, according to the present invention, are distinguished by their exceptionally good flow properties. The dispersed particles undergo only moderate swelling, and mainly only in their surface zone, so that a desirable relationship between the solids content of the dispersions and their viscosity is obtained. Even 50% dispersions are still highly fluid.

Another surprising finding is that, when both ionic groups and non-ionic hydrophilic end groups are built into the molecule, the total concentration of hydrophilic groups may be kept much smaller than that required when only ionic or only non-ionic groups are incorporated, without thereby harmfully affecting the physical properties of the dispersions. The particle size of the dispersed particles in an aqueous polyurethane dispersion is closely connected to the concentration of hydrophilic groups in the dispersed polyurethane in the sense that the larger the number of hydrophilic groups built into the molecule the more finely divided in general is the polyurethane dispersion. Thus, for example, in order to prepare a dispersion having an average particle diameter of T, a minimum of x percent by weight of $-SO_3^{\ominus}$ groups or a minimum of y percent by weight of polyethlene oxide end groups would have to be incorporated in the polyurethane which is to be dispersed. For an average particle diameter T, a mixture of equal parts of the two dispersions would, therefore, contain at least $0.5 \times$ percent, by weight, of $-SO_3^{\ominus}$ groups and 0.5 y percent, by weight, of polyethylene oxide end groups, based on the dispersed polyurethane. However, it was found, according to the invention, that if, for example, both $-SO_3^{\ominus}$ groups and polyethylene oxide end groups are incorporated in an otherwise identical polyurethane, the preparation of polyurethane dispersions having a maximum average particle diameter of T can be achieved with substantially smaller proportions than 0.5 x percent, by weight, of $-SO_3^{\ominus}$ groups and 0.5 y percent, by weight of polyethylene oxide end groups. This has several advantages. First, the polyurethane, which is in itself hydrophobic, needs to be chemically modified to a much smaller extent. As the proportion of hydrophilic centers decreases, coatings produced from such polyurethane dispersions have less tendency to absorb water and to swell. Additionally, the loss in mechanical strength in the moist state, which cannot be completely avoided in dispersion, is also reduced. This is very advantageous, particularly when the polyurethane dispersions, according to the invention, are used for the formation of elastic coatings on textile substrates.

The present invention thus relates to water dispersible polyurethane elastomers having a substantially linear molecular structure, characterized by (a) polyalkylene oxide-polyether chains in terminal positions containing from 0.5 to 10%, by weight, of ethylene oxide units, based on the total quantity of polyurethane, and (b) a content of from 0.1 to 15 milliequivalents of $=N\oplus=$, $-S\oplus-$, $-COO\ominus$ or $-SO_3\ominus$ groups per 100 g.

The present invention also relates to aqueous dispersions of these polyurethane elastomers.

Finally, the present invention relates to the process for the preparation of the water dispersible, substantially linear polyurethanes. This process broadly comprises reacting (a) an organic diisocyanate, (b) an organic compound which behaves as a difunctional material in the reaction with the diisocyanate and which contains isocyanate reactive hydrogen atoms, (c) a first hydrophilic material selected from the group consisting of
   (i) monoisocyanates which contain hydrophilic chains containing ethylene oxide (i.e., $-CH_2-CH_2-O-$) units,
   (ii) compounds which are monofunctional in the isocyanate polyaddition reaction, which contain isocyanate reactive hydrogen atoms, and which contain ethylene oxide units, and
   (iii) mixtures thereof, and (d) a second hydrophilic material selected from the group consisting of
   (i) mono- and/or diisocyanates which contain ionic groups and/or groups capable of conversion into ionic groups,
   (ii) compounds which are mono- and/or difunctional in the isocyanate polyaddition reaction, which contain isocyanate reactive hydrogen atoms and which contain ionic groups and/or groups capable of conversion into ionic groups.

The amounts of (c) and (d) are selected so that the polyurethane obtained contains from 0.5 to 10%, by weight, of ethylene oxide units and from 0.1 to 15 milliequivalents, of ionic groups, preferably $=N=\oplus,=S=\oplus,-SO_3\ominus,-COO\ominus$ per 100 g. Where component (d) contains ionizable groups, the degree of conversion to ionic groups is selected so that the final polymer meets the above definition, i.e., from 0.1 to 15 milliequivalents per 100 grams. The ionizable groups may be converted to ionic groups during or after the reaction of the polyurethane components. If desired, chain lengthening agents known and used in the polyurethane art which have molecular weights below 300 may also be used, as can any other additives generally known and used in the art. The organic compound (b) preferably is one having a molecular weight of from 300 to 6,000.

Organic diisocyanates represented by the general formula $R(NCO)_2$ in which R represents an organic group, obtainable by removal of the isocyanate groups from an organic diisocyanate having a molecular weight of from 112 to 1,000, and preferably from 140 to 400, are suitable for the preferred process mentioned above for the preparation of the polyurethane elastomers. Diisocyanates particularly preferred for the process, according to the invention, are those represented by the general formula indicated above, in which R represents a divalent aliphatic hydrocarbon group having from 4 to 18 carbon atoms, a divalent cycloaliphatic hydrocarbon group having from 5 to 15 carbon atoms, a divalent aromatic hydrocarbon group having from 6 to 15 carbon atoms or an araliphatic hydrocarbon group having from 7 to 15 carbon atoms. Examples of the organic diisocyanates which are particularly suitable for the process include tetramethylene diisocyanate; hexamethylene diisocyanate; dodecamethylene diisocyanate; cyclohexane-1,3- and -1,4-diisocyanate; 1-isocyanato-3-isocyanatomethyl-3,5,5-trimethylcyclohexane; 4,4'-diisocyanatodicyclohexylmethane; aromatic diisocyanates such as 2,4-diisocyanatotoluene and 2,6-diisocyanatotoluene, and mixtures of these isomers; 4,4'-diisocyanatodiphenylmethane, and 1,5-diisocyanatonaphthalene, and the like. Mixtures of diisocyanates can, of course, be used.

The following are specific examples of compounds suitable for the process which have molecular weights of from 300 to 6,000, and preferably from 500 to 3,000, which are difunctional in the isocyanate polyaddition reaction and which contain isocyanate-reactive groups:

(1) dihydroxypolyesters generally known in polyurethane chemistry, which are obtained from dicarboxylic acids (such as succinic acid, adipic acid, suberic acid, azelaic acid, sebacic acid, phthalic acid, isophthalic acid; terephthalic acid; tetrahydrophthalic acid; and the like) and diols (such as ethylene glycol; propylene glycol-(1,2); propylene glycol-(1,3); diethylene glycol; butanediol-(1,4); hexanediol-(1,6), octanediol-(1,8), neopentyl glycol; 2-methylpropanediol-(1,3); the various isomeric bis-hydroxymethyl cyclohexanes; and the like);

(2) polylactones generally known from polyurethane chemistry, e.g., polymers of ε-caprolactone started on the above-mentioned dihydric alcohols;

(3) polycarbonates generally known from polyurethane chemistry, obtainable by, for example, reaction of the above mentioned diols with diarylcarbonates or phosgene;

(4) polyethers generally known in polyurethane chemistry; examples include the polymers or copolymers of styrene oxide, propylene oxide, tetrahydrofuran, butylene oxide or epichlorohydrin which may be prepared with the aid of divalent starter molecules such as water, the above-mentioned diols or amines containing two NH bonds; certain proportions of ethylene oxide may also be included, provided the polyether used does not contain more than about 10%, by weight, of ethylene oxide; however, polyethers obtained without the addition of ethylene oxide are generally used;

(5) polythioethers, polythio mixed ethers and polythio ether esters generally known in polyurethane chemistry;

(6) polyacetals generally known in polyurethane chemistry, for example, those obtained from the above-mentioned diols and formaldehyde; and (7) difunctional polyether esters containing isocyanate-reactive end groups generally known in the art.

The compounds of the above-described type preferably used in the process, according to the invention, are dihydroxypolyesters, dihydroxypolylactones, dihydroxypolyethers and dihydroxypolycarbonates.

The polyurethanes of the instant invention could also be prepared without the use of higher molecular weight polyhydroxyl compounds, i.e., exclusively with the use of diisocyanates and low molecular weight reactants, (molecular weight below 300).

The low molecular weight reactants (i.e., molecular weights below 300) which may be used in the process for the preparation of the self-dispersible polyurethanes include, for example, the low molecular weight diols which have been described for the preparation of dihydroxypolyesters; diamines such as diaminoethane, 1,6-diaminohexane, piperazine, 2,5-dimethylpiperazine, 1-amino-3-aminomethyl-3,5,5-trimethylcyclohexane, 4,4'-diaminodicyclohexylmethane, 1,4-diaminocyclohexane, 1,2-propylenediamine, hydrazine, amino acid hydrazides, hydrazides of semicarbazidocarboxylic acids, bis-hydrazides and bis-semicarbazides; and the like.

In addition to the above-mentioned components which are difunctional in the isocyanate polyaddition reaction, small proportions of trifunctional and higher functional components generally known in polyurethane chemistry may be used in special cases in which slight branching of the polyurethanes is desired. However, these should only be used to such an extent that the average functionality of the starting components does not rise above 2.1.

The reaction components which insure the dispersibility of the polyurethanes herein include both (a) any monoisocyanates and/or compounds which are monofunctional in the isocyanate polyaddition reaction and contain an isocyanate-reactive hydrogen atom, which monoisocyanates and compounds contain hydrophilic chains which have ethylene oxide units and (b) any mono-or di-isocyanates and/or compounds which are monofunctional or difunctional in the isocyanate polyaddition reaction and contain isocyanate-reactive hydrogen atoms, which mono- or di-isocyanates and compounds contain ionic groups or groups capable of conversion into ionic groups.

The preferred hydrophilic components for the incorporation of chains which have hydrophilic ethylene oxide units in end positions are compounds represented by the following formula

H—Y'—X—Y—R'     (I)

and/or compounds represented by the formula

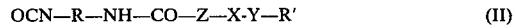

OCN—R—NH—CO—Z—X-Y—R'     (II)

Starting components (c) represented by the first mentioned formula (I) are particularly preferred.

In the above formulae (I) and (II),

R represents a divalent group obtainable by removal of the isocyanate groups from a diisocyanate represented by the formula R(NCO)$_2$ described above, R' represents a monovalent hydrocarbon group having from 1 to 12 carbon atoms, and preferably an unsubstituted alkyl group having from 1 to 4 carbon atoms, X represents the radical obtained by removal of the terminal oxygen atom from a polyalkylene oxide chain having from 5 to 90, and preferably from 20 to 70 chain members, of which at least 40%, and preferably at least 65%, are ethylene oxide units, while the remaining members may consist of other alkylene oxide units including propylene oxide, butylene oxide or styrene oxide units, preferably propylene oxide units, Y and Y' preferably represent oxygen but may also represent NR" in which R" has the meaning defined for R' or, in the case of Y', it may also represent hydrogen, Z represents a group having the meaning defined for Y.

In order to ensure the high molecular weight structure of the polyurethane elastomers, monofunctional polyethers are preferably not used in molar quantities of more than 10%. If larger molar quantities of monofunctional alkylene oxide polyethers are used, it is advantageous to add trifunctional compounds having isocyanate-reactive hydrogen atoms, provided that the average functionality of the starting compounds is not greater than 2.1. The monofunctional hydrophilic starting components are prepared in a similar manner to those of U.S. Pat. Nos. 3,905,929 or 3,920,598 by the alkoxylation of the monofunctional starter such as n-butanol or N-methyl-butylamine by means of ethylene oxide and optionally another alkylene oxide such as propylene oxide. The resulting monohydric polyether alcohols may undergo further modification, although this is less preferred, by reaction, with excess quantities of diisocyanates or by reaction with ammonia to form the corresponding primary aminopolyethers.

The starting components (d) which are essential to the invention include, for example, those compounds described as examples in U.S. Pat. No. 3,479,310 (the disclosure of which is herein incorporated by reference) column 4, line 11 to column 5, line 5, which are either monofunctional or difunctional in the isocyanate polyaddition reaction, or the corresponding compounds with salt groups which are obtainable by simple neutralization or quaternization.

The compounds used as neutralizing or quaternizing agents include, for example, those described in U.S. Pat. No. 3,479,310, in column 6, lines 14 to 33.

Starting components which may be used for incorporating tertiary sulfonium groups into the polyurethane include, for example, the compounds described in U.S. Pat. No. 3,419,533 (the disclosure of which is herein incorporated by reference), column 3, line 75 to column 4, line 51.

It is, in principle, immaterial by what method the cationic centers are built into the polyurethane. For example, apart from the methods described in the two patents mentioned above, a polyurethane or isocyanate prepolymer containing epoxy groups may first be prepared and the epoxy groups in this polyurethane or isocyanate prepolymer may then be reacted with a primary or secondary amine to introduce the basic center which is then converted into the salt form by an inorganic or organic acid or an alkylating agent.

The preferred components (d) used are aliphatic diols containing sulfonate groups of the type described in U.S. Application Ser. No. 614,730 or diaminosulfonates represented by the following formula $$H_2N-A-NH-B-SO_3^\ominus cat^\oplus \qquad (III)$$

in which

A and B represent an aliphatic hydrocarbon group having from 2 to 6 carbon atoms, and preferably an ethylene group, and cat⊕ represents a substituted or unsubstituted ammonium cation or, preferably, a sodium or potassium cation.

In the process, according to the invention, the nature and quantity of component (c) are chosen so that the polyurethanes, according to the invention, contain from 0.5 to 10%, by weight, preferably from 2 to 8%, by weight, of ethylene oxide units —CH$_2$—CH$_2$—O— built into terminal alkylene oxide chains. The nature and quantity or degree of neutralization or quaternization of component (d) used in the process are chosen so that the polyurethanes, according to the invention, contain from 0.1 to 15 milliequivalents per 100 g, preferably from 0.4 to 12 milliequivalents per 100 g of =N⊕=, =S⊕—, —COO⊖ or —SO$_3$⊖ groups. The sum of the number of milliequivalents of built-in ionic groups per 100 g of polyurethane plus the number of so-called "pseudomilliequivalents" of built-in ethylene oxide units per 100 g of polyurethane is preferably from 5 to 35, and most preferably from 8 to 25.

By a "pseudomilliequivalent" of built-in ethylene oxide units is meant the quantity of ethylene oxide units built into a polyalkylene oxide chain which makes the same contribution to the dispersibility of the polyurethane in water as one millequivalent of the incorporated ionic group. In the aqueous polyurethane dispersions, the average particle diameter of the dispersed polyurethane particles depends on the concentration of the incorporated hydrophilic centers in the polyurethane. In polyurethanes which are otherwise similar in their structure, the average particle size generally increases with decreasing concentration of hydrophilic centers. Detailed studies have shown that in any water dispersible polyurethane of a given molecular structure which is purely ionically modified, the ionic groups can always be replaced by a certain quantity of ethylene oxide arranged within a polyether chain to give rise to a corresponding purely non-ionically modified polyurethane which has the same average particle size when dispersed in water, provided that the polyurethane dispersion is prepared in a similar manner, if the milliequivalents of ionic groups contained in the ionically modified polyurethane are replaced by the same number of "pseudomilliequivalents" of non-ionic groups. One milliequivalent of incorporated ionic groups corresponds to 0.5 g of ethylene oxide units built into a polyether chain. One "pseudomilliequivalent" of non-ionic groups, therefore, means 0.5 g of ethylene oxide units built into a polyether chain. It follows, therefore, that an aqueous dispersion of a purely ionically modified polyurethane containing 12 milliequivalents per 100 g of one of the above-mentioned ionic groups has dispersed polyurethane particles of the same average particle diameter as a similarly prepared and structured purely non-ionically modified polyurethane dispersion which contains 6 g per 100 g of ethylene oxide built into a polyether chain.

The process, according to the invention, for preparing the self-dispersible polyurethanes may be carried out by known methods of polyurethane chemistry, both by the one-shot process and by the two-stage process (prepolymer process).

When preparing the self-dispersible polyurethanes, the reactants are used in an equivalent ratio of isocyanate groups to isocyanate-reactive groups of from 0.8:1 to 2.5:1, and preferably from 0.95:1 to 1.5:1. If an excess of isocyanate is used, the reaction will, of course, give rise to isocyanate-containing compounds which, on conversion into an aqueous dispersion, continue to react with water to undergo chain lengthening to form the dispersed end product. The equivalent ratio indicated above, therefore, contains all the components taking part in the synthesis of the polyurethanes, according to the invention, including the chain lengthening agent which contains amino groups, optionally in the form of an aqueous solution, but not that proportion of the water used for dispersion of the polyurethanes which will undergo a chain lengthening reaction with any compounds present which have isocyanate groups. In the context of the present invention, any sulfonic acid groups of carboxyl groups (component d) present in the reaction mixture are not regarded as isocyanate-reactive groups. This is justified in view of the relative inertness of these groups towards isocyanate groups.

Both the one-shot process and the two-stage process may be carried out with or without solvents. Solvents which are suitable for this purpose include water miscible solvents which are inert towards isocyanate groups and have a boiling point below 100° C., e.g., acetone or methyl ethyl ketone. This is particularly desired if, as described below, the polyurethanes are intended to be converted into an aqueous dispersion during or after their preparation.

When the one-shot process is employed, the difunctional compounds described herein, which have molecular weights of from 300 to 6,000 and contain isocyanate reactive end groups are mixed with the hydrophilic reactants (c) and (d) and, if used, the chain lengthening agents having a molecular weight below 300. The diisocyanate component is then added to the resulting mixture without solvents and the mixture is reacted, preferably at temperatures of from 50° to 150° C., optionally after addition of known catalysts used in polyurethane chemistry. The quantity of diisocyanate components is chosen to provide an NCO/OH ratio of from 0.8 to 1.05. One of the abovementioned solvents is gradually added to the mixture as the viscosity rises during the reaction. An organic solution of the completely reacted polyurethane is finally obtained. Its concentration is preferably adjusted to a solids content of from 10 to 70%, by weight, in particular from 15 to 55%, by weight. In this one-shot process, it is particularly advisable to use dihydroxy sulfonates, dihydroxy sulfonic acids, tertiary amines or compounds containing thioether groups and two alcoholic hydroxyl groups as component (d). If the compounds used as component (d) contain groups which can be converted into ionic groups, it is advisable to carry out this conversion in known manner by neutralization or quaternization after the polyaddition reaction, either in organic solution or so that the polyurethane in organic solution is neutralized by neutralizing agents in the water during its conversion into an aqueous dispersion.

Conversion of the dissolved polyurethane elastomers into an aqueous dispersion is then suitably carried out by the addition of water to the stirred solution. The solution then in many cases passes through the phase of a water-in-oil emulsion, whereafter it changes over into an oil-in-water emulsion when it overcomes a viscosity maximum. A purely aqueous stable dispersion is left behind after removal of the solvent by distillation.

When the two-stage process is employed, an isocyanate prepolymer is preferably first prepared under solvent-free conditions from excess diisocyanate, a higher molecular weight compound with isocyanate-reactive groups of the type of compounds described and hydrophilic starting components (c) and optionally (d) at an NCO/OH ratio of from 1.1:1 to 3.5:1, preferably from 1.2:1 to 2.5:1, either in the absence or presence of solvents. If this prepolymer has been prepared without solvents, it may then be taken up in a suitable solvent. The resulting solution of prepolymer may then be reacted in known manner with a chain lengthening agent having a molar weight below 300 of the type mentioned above in addition to component (d) if necessary.

One particular variation of the two-stage process is recommended for preparing the polyurethane dispersions. In this variation of the process, a solution of the chain lengthening agent (the above mentioned diamines or hydrazine derivatives are preferably used as chain lengthening agent in this case) in small quantities of water or of a water/solvent mixture is added to the described solution of the isocyanate prepolymer in such quantities that an NCO/NH ratio of between 2.5 and 1.05 is obtained. This reaction may be carried out at room temperature or preferably at 25° to 60° C. The polyurethane dispersion is finally obtained by adding the remainder of the water and then removing the solvent. Alternatively, in this variation of the process, the chain lengthening agent may be dissolved in the whole quantity of water (50 to 200% by weight, based on the solid polyurethane) finally present in the dispersion. When the two-stage process is employed, it is quite possible and in many cases even preferred not to build component (d) into the prepolymer but to use aqueous solutions of diaminocarboxylates or diaminosulphonates, particularly of the type corresponding to the above formula (III) in the described chain lengthening reaction instead of or in combination with the above-mentioned diamines or hydrazine derivatives.

If desired, however, the two-stage process described above may easily be carried out solvent-free, in which case the isocyanate prepolymer described above is prepared under solvent-free conditions and dispersed in water in which the chain-extending agents containing amino groups may already be dissolved.

In both embodiments of the process in which solvents are used, the sum defined above of milliequivalents of ionic groups plus "pseudomilliequivalents" of non-ionic groups is generally from 5 to 15, and preferably from 8 to 15. When the last mentioned, solvent-free method of preparing the polyurethane dispersions by the two-stage process is employed, this sum should be from 10 to 35, preferably from 10 to 25.

The polyurethanes, according to the invention, may, in principle, be converted into aqueous dispersions by any known method, for example, the method of dispersion without the aid of solvents, e.g., by mixing the polyurethane melt with water in an apparatus capable of producing high shear gradients, or the use of very small quantities of solvents to plasticize the mixture in the same apparatus, or dispersion with the aid of non-mechanical dispersing agents such as extremely high frequency sound waves. Lastly, polyurethane ureas may be chain lengthened after conversion of the prepolymer into an aqueous emulsion. If desired, simple mixers such as stirrer vessels or so-called continuous flow mixers may be used, since the polyurethanes, according to the invention, are self-dispersible.

According to one particular preferred method, a prepolymer containing isocyanate end groups is reacted with a monofunctional hydrophilic polyether to produce a polymeric polyurethane containing hydrophilic polyether segments in end positions. A product of this type may, of course, also be obtained by a one-shot process if a suitably hydrophilic monofunctional polyether is used as starting component for synthesizing the polyurethane. Lastly, a prepolymer containing OH, SH, NH$_2$, NHR or COOH end groups may, of course, be reacted with a hydrophilic monoisocyanate represented by the formula

OCN—R—NH—CO—O—X—Y—R″

R, X, Y and R″ have the meanings already specified.

This group of polyurethanes, according to the invention, is characterized by the grouping

—U—R—NH—CO—O—X—Y—R″ in which

U represents —O—CO—NH—, NH—CO—NH—, —NH—CO— or —S—CO—NH— and

R, X, Y, and R″ have the meaning already indicated.

When preparing polyurethanes containing monofunctional hydrophilic polyethers as end groups, it is preferable to ensure at least partial branching of these products, for example, by including a certain proportion of trifunctional or higher functional components for their synthesis or by partial allophanatization, trimerization or biuretization, provided that the average functionality of all components does not exceed 2.1.

Polyurethanes which have been dispersed, according to the invention, generally have an average particle size of from 10 nm to 5μ, preferably from about 200 nm to 800 nm. The optical dispersion or Tyndall effect, of course, begins to appear in dispersions having particle sizes below 500 mμ. If the sum of the milliequivalents of ionic groups and pseudomilliequivalents of non-ionic groups is less than about 10, it is possible to obtain average particle diameters of from 5μ to about 50μ. Such dispersions are of practical interest, for example, in the production of polyurethane powders.

For a given ionic group content, the electrolyte stability of an ionic polyurethane dispersion depends mainly on three factors:

(1) the number of non-ionic hydrophilic segments present,
(2) the particle size of the disperse phase (determined by measuring the light scattering), and
(3) the solids content of the dispersion.

Given the same chemical structure and approximately the same particle size, ionic group content and solids concentration, the most important factor determining the stability of ionic polyurethane dispersions to electrolytes is the quantity of non-ionic hydrophilic groups (polyethylene oxide segments) present. The higher the percentage proportion of polyethylene oxide, the greater also is the electrolyte stability. A cationic polyurethane dispersion adjusted to a solid content of 10% and containing more than 5% of ethylene oxide segments, for example, is able to tolerate more than an equal volume of a 10% sodium chloride solution, that is to say it is possible to prepare stable cationic dispersions containing more electrolyte than polyurethane solids.

In dispersions having the same chemical composition and the same solids content and pH, the electrolyte stability is determined by the particle size, the stability increasing with the particle size. An increase in the average particle diameter from 10 nm to 300 nm, for example, causes a more than 20-fold increase in the electrolyte stability (measured by the quantity of a 10% sodium chloride solution required to coagulate a cationic polyurethane dispersion which has been adjusted to a solids content of 10%). The smaller the particle size, the more ethylene oxide units are required to ensure an equally high electrolyte stability.

When an ionic polyurethane dispersion is diluted with water, it is found that the electrolyte stability increases with decreasing solids content.

Given these three major factors influencing the electrolyte stability and in addition the possibility of varying the ionic group content, it is possible to produce ionic polyurethane dispersions having the desired electrolyte stability.

This makes it possible, for example, to carry out acid catalyzed cross-linking of the latex particles with formaldehyde or formaldehyde derivatives. It also makes it possible for the dispersions to be pigmented with electrolyte-active pigments or dyes. Another property of the dispersions is that they can be coagulated by heat, so that sheets which are permeable to water vapor can be produced from them simply by heating.

The dispersions may be blended with other ionic or non-ionic dispersions, for example, polyvinyl acetate, polyethylene, polystyrene, polybutadiene, polyvinyl chloride, polyacrylate and copolymer synthetic resin dispersions. Known emulsifiers which are not chemically fixed, preferably ionic emulsifiers, may also be added although they are, of course, not essential. Lastly, fillers, plasticizers, pigments, silicate and carbon black sols and aluminum, clay and asbestos dispersions may be incorporated in the dispersion.

The polyurethane dispersions in water are in most cases stable under conditions of storage and transport and may be processed at a later date whenever required, for example, by a shaping process. On drying, they generally form dimensionally stable coatings on their own, but, if desired, shaping of the products may also be carried out in the presence of known cross-linking agents. The polyurethanes obtained differ in their properties according to the selected chemical composition and the concentration of urethane groups. They may vary from soft, tacky masses to thermoplastic or rubbery elastic products with varying degrees of hardness up to glass hard duroplasts. The hydrophilic property of the products may also vary within certain limits. The elastic products can be thermoplastically processed at elevated temperatures, for example, at 100° to 180° C., provided that they are not chemically cross-linked.

The products of the process are suitable for coating or covering and impregnating woven and non-woven textiles, leather, paper, wood, metals, ceramic, stone, concrete, bitumen, hard fiber, straw, glass, porcelain, synthetic resins of various types, and glass fibers. They are also suitable as anti-static and crease-resistant finishes, as binders for fleeces, as adhesives, adhesifying agents, laminating agents, as agents for rendering substances hydrophobic, as plasticizers, binders, e.g., for cork powder or sawdust, glass fibers, asbestos, paper-like materials, plastics or rubber waste and ceramic materials, as auxiliaries for cloth printing and in the paper industry, as additives for polymers, as sizes, for example, for glass fibers, and for dressing leather.

The dispersions or pastes are preferably applied to a porous substrate which subsequently remains bonded to the finished product such as woven or non-woven textile products or fiber mats, felts or fleeces or paper fleeces, foam plastic sheets or split leather which cause instant solidification of the coating due to their absorbent effect. The products are then dried at elevated temperature and, if necessary, put under pressure. Drying may also take place on smooth, porous or non-porous materials such as metal, glass, paper, cardboard, ceramic materials, sheet steel, silicone rubber or aluminum foil, the finished sheet being subsequently removed and used as such or applied to a substrate by the reversal process by means of glueing, flame laminating or calendering. Application by the reversal process may be carried out at any time.

The properties of the products may be modified by addition of vinyl polymers or active or inactive fillers, for example, by means of polyethylene, polypropylene, polyvinyl acetate, ethylene/vinyl acetate copolymers which may be partly or completely saponified and/or grafted with vinyl chloride, styrene/butadiene copolymers, ethylene copolymers or graft copolymers, polyacrylates, carbon black, silicates, asbestos, talcum, kaolin, titanium dioxide, glass in the form of powder or fibers, and cellulose.

The end product may contain up to 70% of such fillers, based on the total quantity of dry substance, depending on the desired properties and proposed purpose for which the end products are to be used.

Dyes, pigments, plasticizers and additives which influence the flow properties may, of course, also be added.

The products obtained by various methods of application may be dried at room temperature or at elevated temperatures. The temperature to be employed in any given case, which depends, apart from the chemical composition of the material, mainly on its moisture content, drying time and thickness of the layer, can easily be determined by a preliminary test. Whatever the heating time, the drying temperature must be below the solidification temperature.

The sheets may subsequently be coated with a finish to increase the resistance of their surface. Aqueous dispersions or solutions are preferably used for this purpose.

Very hard polyurethanes obtained from finely divided dispersions and sols are suitable for use as stoving lacquers and, in some cases, even as air drying lacquers. They combine great hardness and elasticity with high gloss and, if aliphatic diisocyanates have been used in their preparation, they also have high resistance to light and weathering.

The following Examples serve to explain the composition, method of preparation and various physical properties of the products. The percentages indicated are percentages by weight.

EXAMPLE 1

1632 Parts of a polyester diol having a hydroxyl number of 63 (prepared from hexane-1,6-diol, 2,2-dimethylpropane-1,3-diol and adipic acid) is dehydrated under a vacuum of about 14 Torr at 100° C. and 85 parts of a polyether monohydric alcohol prepared from n- butanol, ethylene oxide and propylene oxide (in a molar ratio ethylene oxide to propylene oxide of 83:17) having a hydroxyl number of 30 (polyethylene-1) are added, followed by a mixture of 244.2 parts of 3-isocyanatomethyl-3,5,5,-trimethylhexylisocyanate and 185 parts of hexane-1,6-diisocyanate. The mixture is stirred at 100° C. until it has an isocyanate content of 4.6%, by weight. When the mixture has cooled to 50°–60° C., 3200 parts of anhydrous acetone are added. A mixture of 107 parts of 3-aminomethyl-3,5,5-trimethylcyclohexylamine, 13.3 parts of sodium-N-(2-aminoethyl)-2-aminoethane sulfonate and 10 parts of hydrazine monohydrate dissolved in 260 parts of water is slowly stirred into this acetonic solution. The mixture is stirred for an additional 10 minutes and 2280 parts of water are then slowly added with vigorous stirring. A bluish white dispersion of the solid substance in a mixture of water and acetone is formed. After removal of the acetone by distillation, an aqueous dispersion having a solids content of 50% is left behind. The particle diameter, measured by the scattering of light, is found to be 200±20 nm.

The solid substance of the dispersion contains 3.15 polyethylene segments and 3 milliequivalents of sulfonate groups ($-SO_3^{\ominus}$) per 100 g of solid substance.

EXAMPLE 2

(Comparison Example With Regard to U.S. Pat. No. 3,905,929)

An aqueous polyurethane dispersion is prepared from the following starting materials by the method described in Example 1:

- 1581: parts of polyester diol for Example 1,
- 148.7: parts of polyether 1 described in Example 1,
- 244: parts of 3-isocyanatomethyl-3,5,5-trimethylcyclohexylisocyanate,
- 185: parts of hexane-1,6-diisocyanate,
- 119: parts of 3-aminomethyl-3,5,5-trimethylcyclohexylamine,
- 10: parts of hydrazine monohydrate and
- 2290: parts of water.

The dispersion has a solids content of 50%. The particle diameter is found to be 190±20 nm. The solid substance contains 5.4% of polyethylene oxide segments.

EXAMPLE 3

(Comparison Example, PU-ionomer)

An aqueous dispersion if prepared from the following starting materials by the method described in Example 1:

- 1700: parts of the polyester diol from Example 1,
- 302: parts of hexane-1,6-diisocyanate,
- 16.8: parts of ethane-1,2-diamine,
- 53.2: parts of sodium-N-(2-aminoethyl)-2-aminoethane sulfonate and
- 3108: parts of water.

The dispersion has a solids content of 40%. Determination of the particle diameter gives a value of 200±20 nm. The solid substance contains 13.6 milliequivalents of sulfonate groups ($-SO_3^{\ominus}$) to 100 g of solid substance.

Samples of the dispersions from Examples 1, 2 and 3 were used in the following experiments:

(1) 5 ml of a dispersion are introduced into 10 ml polyethylene containers which can be sealed, and the containers are kept for 6 hours in a freezer at −10° C. This process is repeated three times at 24 hour intervals. After the final thawing, the stability of the dispersion is assessed visually.

(2) 80 ml of dispersion are stirred at room temperature in a 250 ml stirrer vessel. A glass electrode connected to a pH meter dips into the dispersion. A total of 80 ml of 0.1 N HCl solution is slowly added dropwise from a burette to lower the pH. The pH at which coagulation of the solid substance sets in or at which formation of a clear serum can be observed is determined.

(3) 100 ml samples of the dispersion are stirred in a 250 ml stirrer vessel at a constant stirring speed for 10 hours at different, thermostatically controlled temperatures. The stability and viscosity of the dispersions are assessed after completion of the experiments.

Results:

| Example 1 | Example 2 | Example 3 |
|---|---|---|
| 1st Experiment | | |
| stable | stable | unstable |
| no sediment | no sediment | cheesy solid |
| thin liquid | thin liquid | thin liquid serum (after one cycle) |
| 2nd Experiment | | |
| after addition of the total quantity: stable, thin liquid | after addition of total quantity: stable, thin liquid | precipitation of a cheesy precipitate at pH = 1.8 |
| 3rd Experiment (50° C., 70° C. and 90° C.) | | |
| stable | viscosity increase | stable |
| slight viscosity increase | gelled | stable |
| marked increase in viscosity but still liquid | precipitation | stable |

EXAMPLE 4

(Comparison Example With Regard to U.S. Pat. No. 3,479,310)

An aqueous dispersion is prepared from the following starting materials by the method described in Example 1:

- 1360 parts of the polyester diol from Example 1,
- 310 parts of a polyethylene oxide ether diol having a hydroxyl number of 72,
- 302 parts of hexane-1,6-diisocyanate,
- 51 parts of 3-aminomethyl-3,5,5-trimethylcyclohexylamine,
- 49.4 parts of sodium (2-aminoethyl)-2-aminothane sulfonate
- 3109 parts of water.

The dispersion has a solids content of 40%. It is clear apart from a slight opacity, and when left to stand at room temperature, it solidifies after 3 weeks to a jelly-like mass.

EXAMPLE 5

(Comparison Experiment With Regard to U.S. Pat. No. 3,479,310)

An aqueous dispersion is prepared from the following starting materials by the method described in Example 1:

- 1530 parts of the polyester diol from Example 1,
- 155 parts of the polyether diol from Example 4,
- 302 parts of hexane-1,6-diisocyanate, 51 parts of 3-aminomethyl-3,5,5-trimethyl-cyclohexylamine,
49.9 parts of sodium-N-(2-aminoethyl)-2-aminoethane sulfonic and
3130 parts of water.

The dispersion has a solids content of 40%. It has a bluish opacity. When left to stand, the solid substance settles to the bottom in the form of coarse flakes after three weeks, leaving a cloudy, thin serum above it. The solid substance contains 7.4% of polyethylene oxide segments and 12.5 milliequivalents of sulfonate groups ($SO_3^{\ominus}$) to 100 g of solids.

EXAMPLE 6

(Comparison Example With Regard to U.S. Pat. No. 3,479,310)

An aqueous dispersion is prepared from the following starting materials by the method described in Example 1:
 1615 parts of the polyester diol from Example 1,
 77.5 parts of the polyether diol from Example 4,
 302 parts of hexane-1,6-diisocyanate,
 85 parts of 3-aminomethyl-3,5,5-trimethyl-cyclohexylamine,
 11.4 parts of sodium-N-(2-aminomethyl)-2-aminoethane sulfonate and
 3136 parts of water.

The dispersion has a solids content of 40%. It is white in color with a bluish tinge. When left to stand, the solid substance slowly settles after 3 weeks, and a bluish, opaque serum forms above it. The solid substance contains 3.7% of polyethylene oxide segments and 2.3 milliequivalents of sulfonate groups ($SO_3^{\ominus}$) to 100 g of solids.

EXAMPLE 7

An aqueous dispersion is prepared from the following starting materials by the method described in Example 1:
 1632 parts of the polyester diol from Example 1,
 85 parts of polyether (1) from Example 1,
 302 parts of hexane-1,6-diisocyanate,
 85 parts of 3-aminomethyl-3,5,5-trimethylcyclohexylamine,
 11.4 parts of sodium-N-(2-aminoethyl)-2-aminoethane sulfonate and
 3180 parts of water.

The dispersion has a solids content of 40%. It is bluish white and forms no ground deposit when left to stand for two months. The solid substance contains 3.35% of polyethylene oxide segments and 2.3 milliequivalents of sulfonate groups ($SO_3^{\ominus}$) to 100 g of solid substance.

EXAMPLE 8

An aqueous dispersion is prepared from the following starting materials by the method described in Example 1:
 1632 parts of the polyester diol from Example 1,
 85 parts of polyether (1) described in Example 1,
 244 parts of 3-isocyanatomethyl-3,5,5-trimethylcyclohexylisocyanate,
 185 parts of hexane-1,6-diisocyanate,
 130 parts of 3-aminomethyl-3,5,5-trimethyl-cyclohexylamine,
 6.7 parts of sodium-N-(2-aminoethyl)-2-aminoethane sulfonate acid sodium,
 10 parts of hydrazine monohydrate, and
 3447 parts of water.

The dispersion has a solids content of 40%.

The solid substance of the dispersion contains 3.1% of polyethylene oxide segments and 1.53 milliequivalents of sulfonate groups to 100 g of solid substance. After the experiments described in Example 3 have been carried out, the dispersion is still a thin liquid and shows no sediment.

EXAMPLE 9

An aqueous dispersion is prepared from the following starting materials by the process described in Example 1:
 1666 parts of polyester diol from Example 1,
 43 parts of polyether (1) described in Example 1,
 244 parts of 3-isocyanatomethyl-3,5,5-trimethylcyclohexylisocyanate,
 185 parts of hexane-1,6-diisocyanate,
 107 parts of 3-aminomethyl-3,5,5-trimethylcyclohexylamine,
 13.3 parts of (2-aminoethyl)-2-aminoethane sulfonate
 10 parts of hydrazine monohydrate and
 1170 parts of water.

The dispersion has a solids content of 50%. The solid substance of the dispersion contains 1.57% of polyethylene oxide segments and 3.05 milliequivalents of sulfonate groups to 100 g of solid. When experiments 2 and 3 of Example 3 have been carried out, the dispersion is still a stable, thin liquid. After experiment 1, about 5% of the solid substance has separated as sediment but this can be stirred up and the dispersion is otherwise unchanged.

EXAMPLE 10

(Comparison Example)

An aqueous dispersion is prepared from the following starting materials by the method described in Example 1:
 1666 parts of the polyester diol from Example 1,
 43 parts of polyether (1) described in Example 1,
 244 parts of 3-isocyanatomethyl-3,5,5-trimethylcyclohexylisocyanate,
 185 parts of hexane-1,6-diisocyanate,
 113.9 parts of 3-aminomethyl-3,5,5-trimethyl-cyclohexylamine,
 5.7 parts of sodium-N-(2-aminoethyl)-2-aminoethane sulfonate
 10 parts of hydrazine monohydrate and
 2270 parts of water.

The dispersion has a solids content of 50%. The solid substance of the dispersion contains 1.57% of polyethylene oxide segments and 1.32 milliequivalents of sulfonate groups to 100 g of solid. The dispersion is coarse, and after two weeks it has a sediment which amounts to about 20% of the total solids content.

EXAMPLE 11

1595 Parts of the polyester diol described in Example 1 are dehydrated in a vacuum of about 14 Torr at 100° C. and, after the addition of 129 parts of polyether (1) described in Example 1 and 8.3 parts of bis-(2-hydroxyethyl)-methylamine, a mixture of 244 parts of 3-ioscyanatomethyl-3,5,5-trimethylcyclohexylisocyanate and 185 parts of hexane-1,6-diisocyanate is added. The mixture is stirred at 80° C. until it has an isocyanate content of 4.37%, by weight. 3550 Parts of anhydrous acetone are added to the mixture when it has cooled to 50°–60° C. A solution of 107 parts in 220 parts of water is slowly stirred into the resulting acetonic solution. 10 Parts of undiluted hydrazine monohydrate are then added. After stirring for a further 10 minutes, 8.3 parts of dimethyl sulphate are added. The mixture is then stirred for a further 15 minutes. 2075 Parts of water are then added with vigorous stirring. A bluish white dispersion of the solid substance is formed in a mixture of water and acetone. After removal of the acetone by distillation, an aqueous dispersion of the solid substance at a concentration of 50% is left behind.

The solids content of the dispersion contains 4.6% of polyethylene oxide segments and 2.8 milliequivalents of quaternized nitrogen (=N=) to 100 g of solid.

EXAMPLE 12

340 Parts by weight of a polyester diol of hexane-1,6-diol, 2,2-dimethylpropane-1,3-diol and adipic acid having an OH number of 65 and 21.5 parts, by weight, of a polyether monohydric alcohol (2) having a hydroxyl number of 26 prepared by alkyoxylation of n-butanol with a mixture of 93 parts, by weight, of propylene oxide and 17 parts, by weight, of ethylene oxide are dehydrated for 30 minutes at a pressure of 15 Torr and a temperature of 120° C. When the mixture has cooled to 80° C., 67.2 parts, by weight, of hexane-1,6-diisocyanate are added. The mixture is then stirred for a further 30 minutes. at 80° C. and 90 minutes at 120° C., and the isocyanate content of the prepolymer is determined to be 3.50%, by weight.

The reaction mixture is left to cool to 80° C. before it is slowly diluted with 80 parts, by weight, of acetone. 5.9 Parts by weight of N-methyl-diethanolamine are added to the homogeneous solution at an external temperature of 70° C. and the mixture is stirred for one hour and diluted with a further 160 parts by weight of acetone. 10.9 Parts, by weight, of 1-aminomethyl-5-amino-1,3,3-trimethylcyclohexane are then added, followed by 3.2 parts, by weight, of hydrazine monohydrate and the mixture is stirred at an external temperature of 70° C. for one hour. It is then diluted with a further 160 parts, by weight, of acetone, and 4.2 parts, by weight, of chloracetamide are added. When the IR spectrum of a sample no longer shows an isocyanate band, 11 g of orthophosphoric acid (85%) are added. 1100 Parts, by weight, of water heated to 50° C. are then run into the reaction mixture, and the acetone is removed from the resulting cationic polyurethane dispersion by distillation in a water jet vacuum, while the bath temperature is kept at 50° C. The resulting stable dispersion has a solids content of 31%, by weight, an average particle diameter of 126 to 130 nm and a pH of 3.4. Based on the solids content, the product contains 3.7%, by weight, of polyethylene oxide segments and 11 milliequivalents of quaternary nitrogen per 100 g of polyurethane.

50 ml of a sample of this dispersion adjusted to a solids content of 10% require 110 ml of 10% sodium chloride solution for coagulation.

EXAMPLE 13

(A) The following experimental arrangement is used for carrying out the examples described below:

A Supraton dispersing machine, model D 205, consisting of a combination of a conical rotor in a correspondingly formed stator is used. When the speed of the rotor is about 6000 revs/min, a shear gradient of up to 10,000 sec$^{-1}$ can be produced in the narrow zone between the rotor and the stator. The stator has two concentric inlets at the tip of the cone. The prepolymer described below is fed into the inner inlet by way of a calibrated pump, and water is fed into the outer inlet, also through a calibrated pump. The outlet of the machine leads to a stirrer vessel with overflow which is designed so that the average residence time of substances in the machine is several minutes. The stirrer vessel, machine and feed pipes to the machine are adapted to be cooled or heated.

(B) 4030 Parts of the polyester diol described in Example 1 are dehydrated in a vacuum of 14 Torr at 100° C. 353 Parts of a polyether monohydric alcohol (3) of n-butanol and ethylene oxide having a hydroxyl number of 28,447 parts of an adduct obtained from 1 mol of NaHSO$_3$ and 1 mol of propoxylated (3.8 mol of propylene oxide) butene-2-diol-(1,4) and, lastly, 1153 parts of hexane-1,6-diisocyanate are added. The mixture is stirred at 100° C. until its isocyanate content has fallen to 4.59%, by weight.

This prepolymer and water are fed in through their respective inlets as described under (A) in proportions of 60:79 so that the average time of stay in the zone of high shear gradient is from 10$^{-1}$ to 3×10$^{-1}$ seconds. Heating of the feed pipes is regulated so that the temperature of the prepolymer emulsion leaving the dispersing machine does not exceed 55°–60° C. A solution of 438 parts of 3-aminomethyl-3,5,5-trimethyl-cyclohexylamine and 18 parts of hydrazine monohydrate in 1784 parts of water in proportions of 64:10 is added to the prepolymer emulsion through another calibrated feed device immediately before its entry into the stirrer vessel. The pH of the mixture, which may be 9 to 10 on entry into the stirrer vessel, falls to 7 to 7.5 inside the stirrer vessel so that an almost neutral 40% dispersion of solid can be removed from the overflow. This dispersion shows no sedimentation when left to stand for 3 weeks. The solid substance of the dispersion contains 5.55% of polyethylene oxide segments and 14.7 milliequivalents of sulphonate groups to 100 g of solid.

EXAMPLE 14

1530 Parts of the polyester diol from Example 1 are dehydrated together with 263 parts of the polyether monohydric alcohol (3) at 120° C. in a vacuum of 14 Torr and then cooled to 80° C. 106.4 Parts of the adduct of NaH SO$_3$ and propoxylated butene-2-diol-(1,4) described in Example 13 (B) are then added and the mixture is vigorously stirred. A mixture of 243 parts of 3-isocyanatomethyl-3,5,5-trimethyl-cyclohexylisocyanate and 260 parts of hexane-1,6-diisocyanate is then added and the temperature is raised to 90° C. When an isocyanate content of 6.1% is reached, the reaction mixture is cooled to 50° C. 3645 Parts of water are then slowly added with vigorous stirring. When all the prepolymer mixture has been converted into an aqueous emulsion, a mixture of 199 parts of 3-aminomethyl-3,5,5-trimethyl-cyclohexylamine and 8.5 parts of hydrazine monohydrate in 225 parts of water is added dropwise. The mixture is then slowly cooled to room temperature over a period of 3 hours. A finely divided, 40% dispersion of solid is obtained in the form of a thin liquid. The dispersion shows no signs of sedimentation when left to stand for 3 weeks. The solid substance contains 8.73% of polyethylene oxide segments and 9.9 milliequivalents of sulphonate groups to 100 g of solid.

What is claimed is:

1. A process for the preparation of water dispersible, substantially linear polyurethanes characterized by a content of from 0.5 to 10%, by weight, of ethylene oxide units built into terminal polyether chains and from 0.1 to 15 milliequivalents of ionic groups per 100 grams of polyurethane, said process comprising reacting:
   (a) an organic diisocyanate,
   (b) an organic compound, which behaves as a difunctional material in the reaction with the diisocyanate and which contains isocyanate reactive hydrogen atoms,
   (c) a first hydrophilic material selected from the group consisting of
      (i) monoisocyanates which contain hydrophilic chains containing ethylene oxide (i.e., $-CH_2-CH_2-O-$) units,
      (ii) compounds which are monofunctional in the isocyanate polyaddition reaction, which contain isocyanate reactive hydrogen atoms, and which contain ethylene oxide units, and
      (iii) mixtures thereof, and
   (d) a second hydrophilic material selected from the group consisting of
      (i) mono- and/or diisocyanates which contain ionic groups and/or groups capable of conversion into ionic groups,
      (ii) compounds which are mono- and/or difunctional in the isocyanate polyaddition reaction, which contain isocyanate reactive hydrogen atoms and which contain ionic groups and/or groups capable of conversion into ionic groups.

2. The process of claim 1 wherein component (d) contains ionizable groups and wherein said ionizable groups are converted to ionic groups during or after the reaction of the polyurethane components.

3. The process of claim 1 wherein component (b) is a compound having a molecular weight selected from the group consisting of
   (i) from 300 to 6000,
   (ii) less than 300, and
   (iii) mixtures thereof.

4. The process of claim 3, wherein component (c) is a compound of the formula:

$$H-Y'-X-Y-R'$$

wherein
   X represents the divalent radical obtained by removal of terminal oxygen atom from a polyalkylene oxide group having from 5 to 90 alkylene oxide units, at least 40% of which are ethylene oxide units,
   Y and Y' represent oxygen or $-NR''-$, where R'' corresponds to R', or, in the case of Y', R'' can be hydrogen, and
   R' represents a monovalent hydrocarbon group containing from 1 to 12 carbon atoms.

5. The process of claim 4, wherein the balance of the alkylene oxide units are propylene oxide, butylene oxide or styrene oxide units.

6. The process of claim 5 wherein component (d) is selected from the group consisting of
   (i) diols containing sulfonate groups and aliphatically bound hydroxyl groups, and
   (ii) diamines having aliphatically bound primary and/or secondary amino groups.

7. The process of claim 1 wherein said polyurethane contains from 2 to 8 percent, by weight, of ethylene oxide units and from 0.4 to 12 milliequivalents of $=N=^\oplus, =S-^\oplus, -COO^\ominus$ or $-SO_3^\ominus$ groups per 100 grams.

8. The process of claim 1 wherein the ratio of total isocyanate groups to total isocyanate-reactive groups is from 0.8:1 to 2.5:1.

9. Polyurethanes having a substantially linear molecular structure and being dispersible in water, characterized by
   (a) polyalkylene oxide polyether end chains containing from 0.5 to 10%, by weight, of ethylene oxide units based on the total quantity of polyurethane, and
   (b) from 0.1 to 15 milliequivalents of $=N=^\oplus, =S-^\oplus, -COO^\ominus$ or $-SO_3^\ominus$ groups per 100 grams.

10. The aqueous dispersion of the polyurethane of claim 9.

* * * * *